United States Patent Office 3,459,003
Patented Aug. 5, 1969

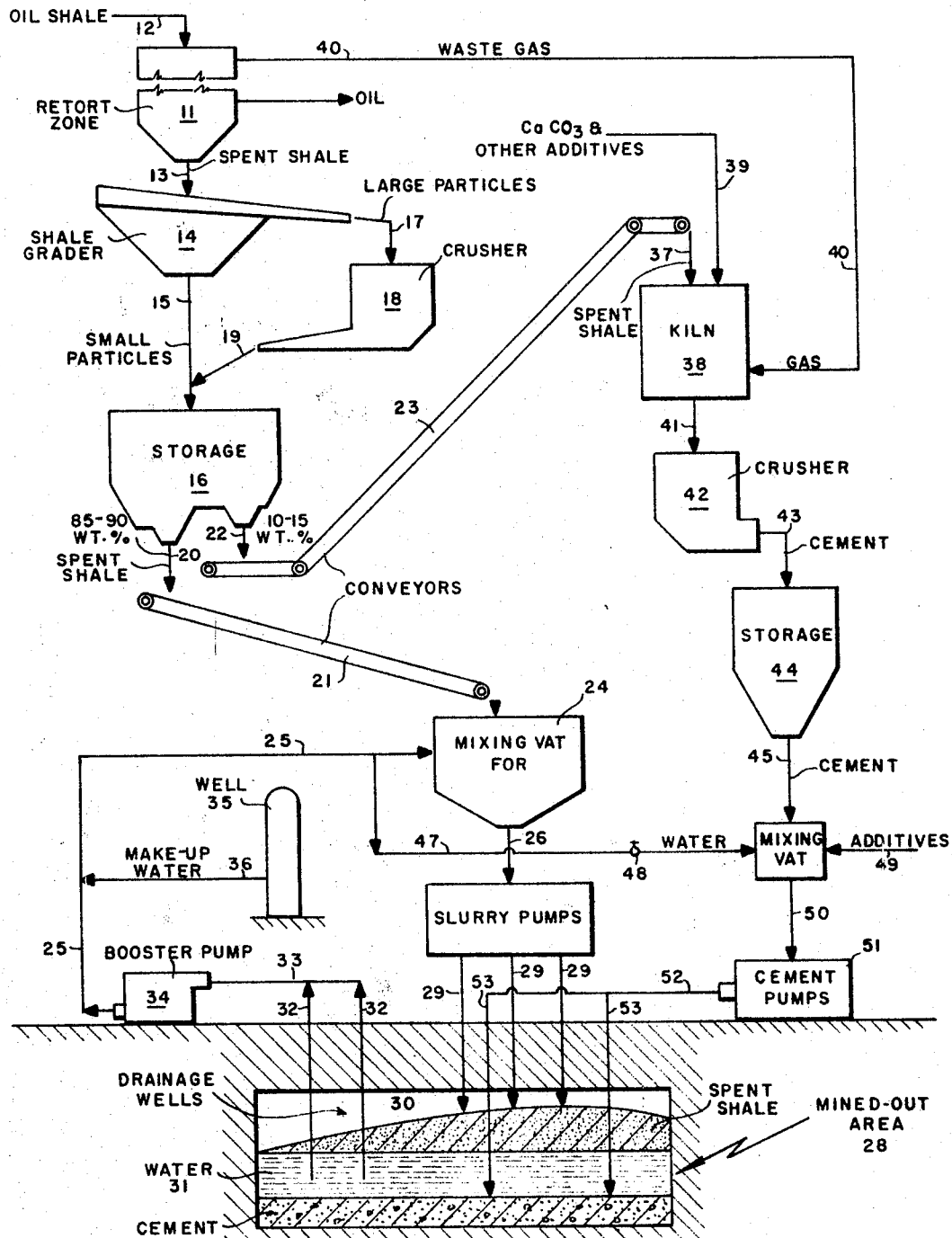

3,459,003
DISPOSAL OF WASTE SPENT SHALE
Billie D. O'Neal, Houston, Tex., assignor to Esso Research and Engineering Company
Filed Nov. 21, 1967, Ser. No. 684,752
Int. Cl. E21f *15/08;* E02d *15/02, 31/10*
U.S. Cl. 61—35                                                   8 Claims

ABSTRACT OF THE DISCLOSURE

Waste spent shale resulting from gas combustion retorting operations is formed into an aqueous slurry and pumped into a mined-out area to deposit said waste spent slurry therein, a portion of the waste spent slurry being converted to cement which is pumped into the deposited waste spent shale to fill voids in and compact the deposited waste spent shale.

BACKGROUND OF THE INVENTION

Field of the invention

The present invention is directed to the disposal of waste spent shale from a gas combustion or other type retorting operation in a mined-out area. More particularly, the invention is concerned with disposal, compaction and cementation of waste spent shale in a mined-out area. In its more specific aspects, the invention is concerned with a method of returning waste spent shale to the area from whence it was mined and forming it into a compact mass therein.

Description of the prior art

It is known to return waste spent shale from gas combustion retorting operation to mined-out areas. However, the large quantities (of the order of 90% by weight) of the waste spent shale poses a problem in that the volume of the waste spent shale caused by voids in the waste spent shale makes it difficult to return all of it to the mined-out area. Furthermore, the cost of transporting the waste spent shale to an underground mine area or to a cut-and-fill mine poses an additional problem. The present invention solves these problems by forming the waste spent shale into a slurry with water which allows the slurry to be pumped. Also, by converting a portion of the waste spent shale to cement and pumping the cement into the deposited waste spent shale, the voids are filled at least in part, in the deposited waste spent shale is compacted and cemented into a competent mass or body.

BRIEF DESCRIPTION OF THE DRAWING

The present invention will be further illustrated by reference to the single figure illustrating a preferred mode and embodiment.

DESCRIPTION OF THE PREFERRED MODE AND EMBODIMENT IN REFERENCE TO THE DRAWING

Referring now to the drawing, numeral 11 designates a gas retort such as one of the Bureau of Mines type or one having serially interconnected preheat, retorting, combustion, and cooling zones into which is fed by line 12 oil shale containing kerogen. This oil shale may be obtained from any of the western states of the United States such as Colorado or from any source. In gas combustion retort 11, the kerogen is converted into shale oil and is removed by means not shown. The spent oil shale which may be defined as waste spent shale is removed from retort 11 by line 13 and introduced thereby into a mechanical grader or particle separator 14 wherein the small particles having particle diameters within the range of from about 5 microns to about 0.5 inch are removed from large particles of waste spent shale. The small particles of waste spent shale are withdrawn from particle separator 14 by line 15 and introduced thereby into a waste spent shale storage hopper 16. The small particles of waste spent shale may suitably comprise from about 75 to about 90 weight percent of spent shale withdrawn from retort 11 by line 13. The large particles of waste spent shale are removed from particle separator 14 by line 17 and introduced thereby into a crusher 18 wherein the large particles of waste spent shale are reduced in size to at least the size of the small particles of waste spent shale. The small particles from crusher 18 are withdrawn by line 19 and conducted into line 15 for introduction of small particles of waste spent shale into spent shale storage hopper 16.

A portion of the waste spent shale in the storage hopper 16 is discharged by line 20 onto a conveyor or other mechanical transporting means 21. A second portion of the waste spent shale is discharged from the storage hopper 16 by line 22 onto a conveyor or other mechanical transporting means 23.

About 85 to 90 percent by weight of spent shale is discharged onto conveyor means 21 while about 10 to 15 percent by weight is discharged onto conveyor means 22. The waste spent shale discharged onto conveyor means 21 is transported thereby to a mixing vat 24 into which water from a source which will be described further hereinafter is introduced by line 25. Mixing vat 24 may be provided with mixing means such as a jet nozzle for introduction of water under pressure or with paddle or propeller type agitator means suitably powered by power means. In any event, a slurry of spent shale is formed in mixing vat 24 comprised of about equal parts by weight of water and spent shale; however, the respective amounts of water and spent shale may vary depending only on the amount of water needed to provide a pumpable slurry. Thus, it is contemplated that greater or lesser amounts of water may be used.

The slurry in mixing vat 24 is withdrawn by line 26 by spent shale slurry pumps, generally designated by numeral 27, for pumping the slurry of spent shale in water into a mined-out area 28 through lines and/or wells 29 depending on whether the mined-out area 28 is a confined area such as an underground (a room and pillar) mine or a cut-and-fill mine. In either event, the spent shale is deposited in the mined-out area 28 as a slurry, the spent shale being deposited to form body 30 of spent shale having substantial porosity or substantial percent of voids. The water in the slurry separates to form a body 31 of water. This water is continuously withdrawn from body 31 by means of drainage wells or lines 32 connecting to line 33 containing a booster pump 34 to which is connected line 25. Make-up water may be introduced into line 25 from a water well 35 or other source which connects to line 25 by line 36.

The 10 to 15 percent by weight of the shale withdrawn from shale hopper 16 by line 22 and deposited on conveyor means 23 is transported thereby and deposited by line 37 into a vertical or rotary kiln 38 into which is fed by line 39 calcium carbonate in the form of crushed limestone and other additives such as calcium oxide, clay, or gypsum. For formation of portland type cement, vertical or rotary kiln 38 may be heated by hot waste gas withdrawn by line 40 from gas combustion retort 11 and introduced in contact with kiln 38 to heat same and cause calcination of the spent shale, the limestone and other additives to form cement clinker which is withdrawn from kiln 38 by line 41 and deposited into a crusher means 42 where the clinker is crushed or finally ground to form cement which is withdrawn by line 43 to cement storage 44.

The cement in storage 44 may be withdrawn by line 45 into a mixing vat 46 where it is mixed with water introduced thereto by line 47 which connects into line 25, line 47 being controlled by valve 48. Suitable additives such as calcium chloride, potassium hydroxide and sodium silicates may be used to accelerate the setting and hardening of the cement. Additives such as gypsum and sodium tannate may be used to retard the setting and hardening of the cement. These additivies, as needed, are introduced into mixing vat 46 by line 49. Suitably, although not shown, the cement withdrawn by line 45 may be used for structural and other construction purposes as may be desired. Cement slurry is withdrawn from mixing vat 46 by line 50 and is pumped by cement pumps 51 by way of line 52 which connects to lines or wells 53 for introduction of the cement slurry into the spent shale body 30 to fill at least a portion of the voids and to cause compaction and cementation to the body 30 of spent shale. By virtue of the operation as has been described hereinbefore, the spent shale is introduced into a mined-out area by pumping thereby disposing of it readily and by virtue of adding the cement material, it is caused to be compacted to give it substantially the strength it had prior to mining and making it competent to support considerable weight. The spent shale introduced as a slurry settles in the presence of water and under fluid conditions to enhance the compaction and cementing. Actually, in accordance with the present invention, the waste spent shale discharged from the retort sets up to form a low grade cement solid when exposed to water. Thus, in the present invention, by transporting it to the mined-out area as a slurry also provides a means for compaction. However, in accordance with the present invention, heating with a kiln further provides decomposition and a better quality of low grade cement. The additional limestone or calcium oxide may be used to up grade cement if necessary; however, in special instances, additional additives may not be required.

The following table provides a typical analysis of oil shale after removal of organic material.

Table I

| Mineral matter: | Weight percent |
|---|---|
| Carbonates, principally dolomite | [1] 48 |
| Feldspars | 21 |
| Quartz | 13 |
| Clays | 13 |
| Analcite | 4 |
| Pyrite | 1 |
| | 100 |

[1] The chemical decomposition of the carbonates from an oil shale retort may vary from 20-80 percent. Additional decomposition takes place in the kiln providing sizable quantities of CaO, the principal ingredient of cement.

Thus, in accordance with the present invention, a method is provided of returning spent shale to a mined-out area by pumping it in the form of slurry in water. The method provides compaction which allows for greater placement density of the spent shale particles than when the waste spent shale is returned as a dry solid. Moreover, compaction is enhanced by the settling of the particles in a fluid. By withdrawing water from the deposited waste spent shale, the pressure gradient and the flow of water in a horizontal plane to vertical drainage lines or wells causes favorable particle orientation and enhances compaction of the shale particles. Additionally, the conversion of a portion of the shale to cement provides for filling the pore space or voids in the shale so that once hardening of the cement takes place the waste material particles become bonded together and the waste heap becomes a competent mass of material with the refill area having a substantial amount of its original structural strength restored.

Although the drawing illustrates the mined-out area incompletely filled, it is within the purview of this invention to fill completely an area such as an underground mine and cement by pressure pumping which in the case of underground mines prevents further subsidence in the mined-out area. As an example, disposing of the waste spent shale from above ground by gas combustion retort, in a 100,000-barrel-per-day operation requires mining about 180,000 tons of oil shale per day which represents a bulk volume of about 50 acre feet per day. After being crushed, processed and stacked, the solid waste or spent shale waste would weigh in the vicinity of about 160,000 tons, but because of the porosity of the stacked material it would represent a bulk volume of about 60 acre feet. Stating this another way, the waste spent shale from a 100,000-barrel-per-day plant covers about 22,000 acre feet for each year of operation. This large volume of material would represent a blight on the countryside, and it is hence necessary to dispose of it underground. The present invention allows this to be done.

If the waste spent shale were returned to the mined-out area in accordance with prior art techniques, the waste to be disposed of from a 100,000-barrel-per-day plant would be about 10 acre feet per day, more than can be disposed of in a mine by placing it dry. The waste spent shale alone amounts to 3,650 acre feet of surface waste per year for a 100,000-barrel-per-day plant. In accordance with the present invention, all of the waste spent shale may be disposed of by taking advantage of the porosity of the waste spent shale which may be in the order of 20 to 30 percent, probably of about 25 percent, which can be reduced to 10 to 12 percent by utilization of the cement manufactured from the waste spent shale allowing deposition of all of the waste spent shale in the mined-out area. In accordance with the present invention, water may be obtainable from surface sources or from sub-surface sources through wells at shallow depths. Hence in oil shale mining operations with the present invention, the deepest shale would be mined first to allow disposal of the water encountered at shallow depths.

In a cut-and-fill mining operation, the present invention provides means for rebuilding a competent floor from which to conduct future operations.

The nature and objects of the present invention having been completely described and illustrated and the best mode and embodiment contemplated set forth, what I wish to claim as new and useful and secure by Letters Patent is:

1. In the disposal of waste spent shale from a retorting operation in a mined-out area, the method which comprises:
    forming a first slurry of a first portion of about 85 to about 90 percent of the waste spent shale in water;
    pumping said first slurry into said mined-out area to deposit waste spent shale therein;
    converting a second portion of about 10 to about 15 percent of said waste spent shale into cement;
    forming said cement into a second slurry; and
    pumping said second slurry into said deposited waste spent shale to fill at least a portion of the voids therein.

2. A method in accordance with claim 1 in which water is separated from said deposited waste spent shale and recovered for reuse in forming at least one of slurries.

3. A method in accordance with claim 1 in which the waste spent shale is crushed to reduce its particle size before formation of the waste spent shale slurry and before conversion of the second portion into cement.

4. A method in accordance with claim 1 in which the cement is formed by mixing calcium carbonate with the second portion of waste spent shale followed by calcining the resulting admixture in a kiln heated with hot gases from the retorting operation.

5. A method in accordance with claim 4 in which cement additives are added with the calcium carbonate.

6. A method in accordance with claim 1 in which water is separated from said deposited waste spent shale and recovered for reuse in forming said first slurry.

7. A method in accordance with claim 1 in which the waste spent shale is formed into a slurry by admixing therewith about equal parts of water on a weight basis.

8. A method in accordance with claim 2 in which the recovered water is used in forming both of said slurries.

References Cited

UNITED STATES PATENTS

| | | | |
|---|---|---|---|
| 904,021 | 11/1908 | Schwerin | 299—11 |
| 1,004,419 | 9/1911 | Griffith | 299—11 |
| 1,404,112 | 1/1922 | Goebl et al. | 61—36 |
| 3,340,693 | 9/1967 | Row | 61—36 |

JACOB SHAPIRO, Primary Examiner

U.S. Cl. X.R.

299—11